United States Patent
Tetzlaff et al.

[11] Patent Number: 5,853,911
[45] Date of Patent: *Dec. 29, 1998

[54] ELECTROCHEMICAL CELL

[75] Inventors: Karl-Heinz Tetzlaff; Rüdiger Walz, both of Kelkheim; Freddy Helmer-Metzmann, Mainz, all of Germany

[73] Assignee: Hoechst Aktiengesellschaft, Frankfurt, Germany

[*] Notice: The term of this patent shall not extend beyond the expiration date of Pat. No. 5,656,389.

[21] Appl. No.: 816,263

[22] Filed: Mar. 13, 1997

Related U.S. Application Data

[63] Continuation of Ser. No. 432,990, May 2, 1995, Pat. No. 5,656,389.

[30] Foreign Application Priority Data

May 4, 1994 [DE] Germany ............ P 44 15 678.2

[51] Int. Cl.⁶ ............ H01M 4/88; H01M 4/86
[52] U.S. Cl. ............ 429/41
[58] Field of Search ............ 429/41

[56] References Cited

U.S. PATENT DOCUMENTS

| | | |
|---|---|---|
| 2,913,511 | 11/1959 | Grubb, Jr. . |
| 3,117,034 | 1/1964 | Tirrell . |
| 3,124,520 | 3/1964 | Juda . |
| 3,531,329 | 9/1970 | Selwitz . |
| 3,930,094 | 12/1975 | Sampson et al. . |
| 4,847,173 | 7/1989 | Mitsunaga et al. . |
| 5,084,144 | 1/1992 | Reddy et al. . |
| 5,308,465 | 5/1994 | Hillrichs et al. . |
| 5,438,082 | 8/1995 | Helmer-Metzmann et al. . |
| 5,656,389 | 8/1997 | Tetzlaff et al. ............ 429/41 |

FOREIGN PATENT DOCUMENTS

| | | |
|---|---|---|
| 0 546 594 | 9/1993 | European Pat. Off. . |
| 0 582 333 | 2/1994 | European Pat. Off. . |
| 43 12 126 | 10/1994 | Germany . |

*Primary Examiner*—Kathryn L. Gorgos
*Assistant Examiner*—Carol Chaney
*Attorney, Agent, or Firm*—Frommer Lawrence & Haug LLP

[57] ABSTRACT

In the electrochemical cell comprising a housing in which two diffusion electrodes are arranged which contain active catalyst particles and at whose rears in each case a contiguous compartment for a gas is provided, a compartment for a liquid electrolyte being provided between the diffusion electrodes, there is arranged, between the diffusion electrodes, at least one anion exchanger membrane directly in front of one of the diffusion electrodes.

3 Claims, 1 Drawing Sheet

ELECTROCHEMICAL CELL

This application is a continuation of application Ser. No. 08/432,990, filed May 2, 1995, now U.S. Pat. No. 5,656,389.

The invention relates to an electrochemical cell in accordance with the preamble of the main claim.

The device is suitable both for gas-generating electrolytic processes such as, for example, the electrolysis of water or the electrolysis of alkali metal chloride, and for gas-consuming reverse processes such as, for example, the generation of electricity from hydrogen and oxygen by means of fuel cells.

Diffusion electrodes, which in the literature are often referred to as gas diffusion electrodes, are to be understood as electrodes having a porous structure, whose pore system is in part permeated by the gas and in part by an ion-conducting medium. Often these diffusion electrodes are fabricated from a granular material which contains an electrochemical catalyst. To control the wetting properties and to act as a binder, plastic is admixed, for example polytetrafluoroethylene.

In a known electrochemical cell, the diffusion electrodes are wetted by a liquid electrolyte from the front, either directly or via a diaphragm, and the reaction gas is supplied or drawn off, respectively, from the rear. In this device, catalyst particles of the diffusion electrode may be removed, by way of erosion, by the flowing electrolyte or pass into the electrolyte in dissolved form, as is known of some silver-containing diffusion electrodes at certain potentials.

Other known electrochemical cells solely use a solid (immobile) electrolyte between the diffusion electrodes, such as, for example, an ion exchanger membrane. With these cells it is very difficult to control the water budget and the heat flows, nor can the exacting dynamic demands, made on, for example, water electrolysis cells or fuel cells for cars, be mastered satisfactorily with these cells.

The object of the invention is to utilize both the features of the electrochemical cells containing liquid (mobile) electrolyte and the features of the electrochemical cells containing solid (immobile) electrolyte, without incurring the drawbacks associated therewith.

An electrochemical cell of the type mentioned at the outset is therefore proposed which is distinguished by there being arranged, between the diffusion electrodes, at least one ion exchanger membrane directly in front of one of the diffusion electrodes.

The liquid electrolyte used can be a salt solution, an acid or a base. The ion exchanger membrane employed can be either a cation exchanger membrane or an anion exchanger membrane. In this context it is also possible for a cation exchanger membrane to be employed for the transport of anions, where strong electrolytes are involved, such as, for example, in the transport of OH$^-$ ions in an alkaline fuel cell. The characteristics of such an arrangement are described in more detail in the example below.

According to a further embodiment of the invention it is advantageous for the ion exchanger membrane to be arranged directly in front of a diffusion electrode. This can be effected by the ion exchanger membrane being permanently joined to the diffusion electrode. The permanent bond can be achieved, for example, by pressing on or rolling on. This operation can be supported by the ion exchanger membrane being partially melted or solvated. If a solution containing ion exchanger, or an ion exchanger melt, is set to a sufficiently low viscosity, the diffusion electrode can alternatively be coated by methods known per se. In this case, the electrocatalyst or the particles containing the catalyst may be embedded in the ion exchanger entirely or in part. Alternatively, the particles containing catalyst may first be encapsulated by methods known per se by a thin ion exchanger layer, from which particles a diffusion electrode is then fabricated. In so doing, care should be taken to ensure adequate electrical conductivity between the particles.

It was found to be particularly advantageous for the ion exchanger membrane to be joined to an oxygen-consuming cathode, especially if the cathode contains silver as the electrocatalyst. Such cathodes can be employed in alka-line fuel cells or electrolytic processes such as the electrolysis of alkali metal chloride. Contrary to the generally accepted view, it is possible in this case also to use cation exchanger membranes, which generally show better stability with respect to alkali than do anion exchanger membranes.

In the electrochemical cell according to the invention, an ion exchanger membrane can be arranged both in front of the anode and in front of the cathode.

A particularly suitable ion exchanger membrane was found to be a membrane made of sulfonated polyetheretherketone, because this material is readily soluble in commercial solvents and is therefore easy to use. To improve the stability it is also possible to employ homogeneous blends of polyetheretherketone and polysulfone.

The electrochemical cell according to the invention has a number of advantageous properties which are significant for fuel cells and for the electrolysis of water:

The heat exchange can be stabilized in a simple manner and with quick response by the electrolyte being circulated via heat exchangers.

The removal of reaction water in the case of the fuel cell, and the removal of water in the case of the electrolysis of water is effected in a simple manner via the liquid electrolyte and need not, as for known membrane cells, be brought about via the gas phase.

By virtue of the liquid electrolyte, the water budget of the ion exchanger membrane can be stabilized more effectively than in the case of the known membrane cell, for which the water budget has to be controlled via the gas phase.

Owing to the bond between diffusion electrode and ion exchanger membrane, it is now virtually impossible for the catalyst to pass into the electrolyte.

In the case of gas-forming reactions such as the electrolysis of water, any generation of gas on the front of the electrodes is reliably prevented.

Owing to the bond between diffusion electrode and ion exchanger membrane, gas breakthrough is reliably prevented. Thus the reliability of the operation of electrochemical cells is considerably increased.

BRIEF DESCRIPTION OF THE DRAWINGS

The invention is described by way of example with reference to FIGS. 1 to 2:

An electrochemical cell 1, for example a fuel cell, comprises two diffusion electrodes 2 and 3. The diffusion electrode 3 carries an ion exchanger membrane 4. FIG. 2 shows a detail of diffusion electrode 3 and ion exchanger membrane 4.

Figure 1:
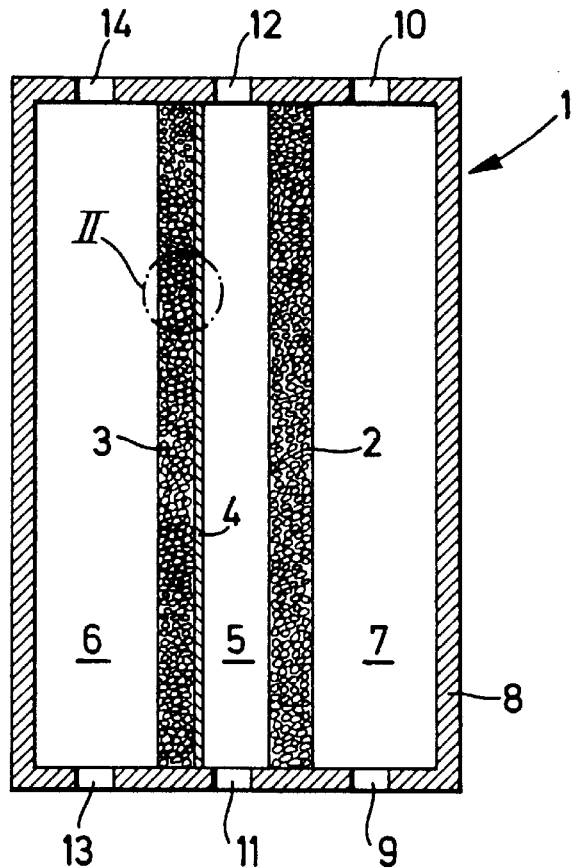
FIG. 1 shows an electrochemical cell in section
Figure 2:
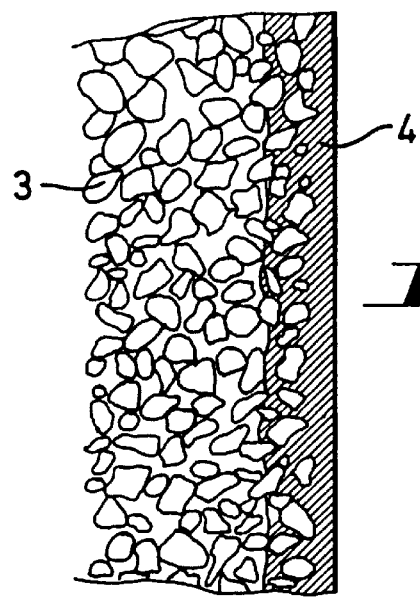
FIG. 2 shows a detail of a diffusion electrode with ion exchanger membrane

The ion exchanger membrane 4 may be a polymer material known per se having functional groups such as sulfone groups, carboxyl groups or tertiary amines. Advantageously, diffusion electrodes 3 and ion exchanger membrane 4 are intimately joined. This can be effected by coating methods known per se such as hot-pressing of diffusion electrode and ion exchanger membrane, or by dissolving the ion exchanger membrane 4 in a solvent and coating the diffusion electrode 3 with this solution. In an electrochemical cell it is also possible for both diffusion electrodes to be coated with an ion exchanger membrane. Between the diffusion electrodes, a compartment 5 for the electrolyte is arranged. Preferably, a liquid electrolyte is provided which is connected, via the orifices 11 and 12, to an external circuit for the purpose of mass transfer and heat exchange. Particularly suitable as the electrolyte are strong alkalis or acids.

Behind the diffusion electrode 2 there is a compartment 7 which is designed to take up gas or give off gas. The gases can be supplied or drawn off through the orifices 9 and 10. The diffusion electrode 3, analogously, has a rear compartment 6 and orifices 13 and 14 in the housing 8.

EXAMPLE

A silver-containing diffusion cathode, whose fabrication is described in DE-A 3303779 A1, was knife-coated with a solution to give a layer of 20 μm which comprises the solvent N-methylpyrrolidone (NMP) which contained approximately 20% by weight of a cation-conducting polymer of the composition: 60% of sulfonated polyetheretherketone (degree of sulfonation 70% of the o-phenyl-o-unit) and 40% of polysulfone (®Ultrason). The sandwich thus obtained was dried for 24 hours in a drying oven at 100 mbar (absolute) at 80° C. The polymer film obtained, having a thickness of approximately from 10 to 20 μm, adhered to the electrode in a homogeneous layer.

The coated diffusion electrode was studied in a half-cell arrangement with an active electrode area of 2.25 m². A hydrogen-generating Raney nickel cathode served as the reference electrode. The diffusion electrode was supplied with pure oxygen via a Luggin capillary having a diameter of 0.8 mm, which was positioned at a distance of 1.06 mm from the diffusion electrode. The electrolyte used was 30% strength aqueous potassium hydroxide. The experiment took place at 80° C. under atmospheric pressure. By means of an electronic interrupter circuit it was possible to measure both the pure overpotential and the potential (RHE), respectively, and the ohmic voltage drop (IR) between the tip of the Luggin capillary and the active zone of the diffusion electrode.

For a current of 1 ampere, the potential (RHE) was −903 mV, the IR fraction being 18 mV.

For the uncoated reference specimen, the potential (RHE) for the same current was −900 mV, the IR fraction being 29 mV.

After the test had lasted approximately 46 hours, the coating did not show any perceptible changes. In the process, the load on the cathode had been up to 6 amperes at 80° C. and a total pressure of 26 bar.

As the measurement shows, no additional voltage drop (IR fraction) due to the coating with this cation exchanger membrane can be observed, nor is the transport of the water necessary for the reaction noticeably impeded:

$O_2 + 2H_2O + 4e \rightarrow 4OH^-$

According to the generally prevailing view, the transport of $OH^-$ through a cation exchanger membrane should not be possible. As the example shows, good results are obtained if the cationic exchanger membrane is thin and the alkali concentration is high.

The above results indicate both an improvement in the overpotential and an improvement of the IR fraction by virtue of the ion exchanger membrane.

We claim:

1. An electrochemical cell comprising a housing in which two diffusion electrodes are arranged which contain active catalyst particles, a compartment for a liquid electrolyte is provided between the diffusion electrodes and at least one ion exchanger membrane is arranged between the diffusion electrodes directly in front of one of the diffusion electrodes, and a contiguous compartment for a gas is provided on a rear side of the gas diffusion electrodes opposite from the ion exchanger membrane, wherein the electrolyte is alkaline which has an alkali concentration greater than or equal to approximately 30% by weight, and the ion exchanger membrane is an anion exchanger membrane, wherein the ion exchanger membrane used is a sulfonated polyetherketone.

2. An electrochemical cell comprising a housing in which two diffusion electrodes are arranged which contain active catalyst particles, a compartment for a liquid electrolyte is provided between the diffusion electrodes and at least one ion exchanger membrane is arranged between the diffusion electrodes directly in front of one of the diffusion electrodes, and a contiguous compartment for gas is provided on a rear side of the gas diffusion electrodes opposite from the ion exchanger membrane, wherein the ion exchanger membrane used is a homogeneous blend comprising sulfonated polyetherketone and a polysulfone and the liquid electrolyte has an alkali concentration greater than or equal to approximately 30% by weight.

3. A method of producing an electrochemical cell comprising the steps of arranging two diffusion electrodes containing active catalyst particles in a housing, forming a compartment for a liquid electrolyte between the diffusion electrodes and arranging at least one ion exchanger membrane between the diffusion electrodes directly in front of one of the diffusion electrodes, arranging a contiguous compartment for a gas on a rear side of the gas diffusion electrodes opposite from the ion exchanger membrane wherein the electrolyte is alkaline and has an alkali concentration greater than or equal to approximately 30 % by weight and the ion exchanger membrane is an anion exchanger membrane and is a sulfonated polyetherketone.

* * * * *